United States Patent [19]

Omata

[11] Patent Number: 5,407,720
[45] Date of Patent: Apr. 18, 1995

[54] OPTICAL RECORDING MEDIUM AND PROCESS FOR PRODUCING THE SAME

[75] Inventor: Hiroshi Omata, Kawasaki, Japan

[73] Assignee: Canon Kabushiki Kaisha, Tokyo, Japan

[21] Appl. No.: 152,882

[22] Filed: Nov. 16, 1993

Related U.S. Application Data

[63] Continuation of Ser. No. 769,808, Oct. 2, 1991, abandoned.

[30] Foreign Application Priority Data

Oct. 3, 1990 [JP] Japan .................................. 2-263840

[51] Int. Cl.6 .............................................. B32B 3/00
[52] U.S. Cl. ........................................ 428/64; 428/65; 428/913; 346/76 L; 346/135.1; 369/275.1; 369/275.4; 349/264
[58] Field of Search ............................ 428/64, 65, 913; 346/76 L, 135.1; 369/275.1, 275.4

[56] References Cited

U.S. PATENT DOCUMENTS

| | | | |
|---|---|---|---|
| 4,423,502 | 12/1983 | Dil ........................................ | 369/275 |
| 4,556,967 | 12/1985 | Braat ..................................... | 369/275 |
| 4,939,023 | 7/1990 | Omata et al. ......................... | 428/215 |
| 4,947,384 | 8/1990 | Suzuk .................................. | 369/275.1 |

FOREIGN PATENT DOCUMENTS

| | | |
|---|---|---|
| 7301681 | 7/1985 | Australia . |
| 0155452 | 9/1985 | European Pat. Off. . |
| 2018489 | 10/1979 | United Kingdom . |

*Primary Examiner*—Patrick J. Ryan
*Assistant Examiner*—Elizabeth Evans
*Attorney, Agent, or Firm*—Fitzpatrick, Cella, Harper & Scinto

[57] ABSTRACT

An optical recording medium has tracking tracks and recording tracks interposed between the tracking tracks. The width of the recording tracks in a specific region is larger than that in other region.

71 Claims, 8 Drawing Sheets

OPTICAL RECORDING MEDIUM AND PROCESS FOR PRODUCING THE SAME

This application is a continuation of application Ser. No. 07/769,808 filed Oct. 2, 1991, now abandoned.

BACKGROUND OF THE INVENTION

1. Field of the Invention

This invention relates to an optical recording medium having tracks capable of recording optically reproducible data, and more particularly to an optical recording medium having tracking tracks for following tracks capable of recording data, that is, for tracking, and also to a process for producing the optical recording medium.

2. Related Background Art

Generally, an optical recording medium, such as an optical disk, an optomagnetic disk, etc. has data recording tracks (which will be hereinafter referred to as "recording tracks") and tracking tracks formed in a manner optically discriminatable from the recording tracks so that a recording-reproducing beam may correctly follow the recording tracks. On the recording tracks which are each interposed between the tracking tracks, address data for providing positional information on the recording tracks to an optical head control system, etc. are formed in advance as prepits.

The prepits are recesses each having a depth of an odd number multiple of $\lambda/4n$ (wherein $\lambda$ is the wavelength of reproducing beam and n is the refractive index of the substrate) so selected as to usually provide a maximum modulation to the reproducing beam, that is, a tracking beam, irradiating the optical recording medium so that the reproducing beam may pass through the substrate. As tracking tracks, grooves formed on the substrate are usually used.

So far known methods for detecting tracking errors of such an optical disk include the so called push-pull method and the three-beam method. The push-pull method comprises using a single beam and outputting the difference in the outputs of reflected and diffracted beam lights of an incident single beam on and from the disk at two light-receiving sections of two divided parts of a photodiode, the two divided parts being symmetrically provided at the track center, thereby detecting a tracking error. The three-beam method comprises using a main beam for recording and reproducing data onto and from recording tracks and further using primary light diffracted by a diffraction grating as auxiliary beams at the same time, and outputting the difference in the outputs of the reflected light of the auxiliary beams at two light-receiving sections receiving the reflected light, thereby detecting a tracking error.

When the prepit length and the prepit distance are shortened in such an optical recording medium to increase the recording density, as shown, for example, in FIGS. 15 and 16, the amplitude $W_{16}$ of quantity of reflected light (difference in the brightness) is decreased and the S/N of the prepits is also lowered, if the spot size of reading beam is constant. This tendency is particularly remarkable for prepits formed on the recording tracks on the inner peripheral portion of a disk-type optical recording medium, because, when a reading light spot is placed between one prepit and another, no sufficient quantity of reflected light can be obtained due to the interference from the preceding and successive prepits. If the pit size of the prepits is reduced to decrease the interference from the prepits, insufficient darkness can be obtained when the reading light spot is on the prepit, and thus there is no more improvement in the signal output. That is, even if the pit shape is changed, there are still such problems that in case the reading light spot size is constant, no sufficient signal output can be obtained at parts of the disk having a shorter pit distance when the recording density of address data is increased.

SUMMARY OF THE INVENTION

The present invention has been accomplished to solve the foregoing problems encountered so far in the relevant art.

An object of the present invention is to provide an optical recording medium capable of increasing the signal output of prepits, particularly at parts of the disk having shorter prepit distance, and a process for producing the same.

Another object of the present invention is to provide an optical recording medium capable of increasing the signal output of prepits and preventing a decrease in the amplitude of a tracking error signal in the prepit region at the same time, and a process for producing the same.

Another object of the present invention is to provide an optical recording medium capable of increasing the signal output of the prepit region, outputting even tracking error signals throughout the entire surface of the optical recording medium and preventing any leak-in of pulse signals generated at AT signals in the prepit region due to DC offsets, thereby obtaining AT signals with less noise.

That is, the present invention provides an optical recording medium which comprises tracking tracks and recording tracks interposed between the tracking tracks, the width of the recording tracks in a specific region being larger than that in another region.

The present invention also provides an optical recording medium which comprises tracking grooves and recording tracks interposed between the tracking grooves, the depth of tracking grooves in a specific region being smaller than that in another region.

The present invention further provides an optical recording medium which comprises tracking grooves and recording tracks interposed between the tracking grooves, the width of the recording tracks in a specific region being larger than that in another region and the depth of the tracking grooves in the specific region being smaller than that in the another region.

The present invention further provides a substrate for an optical recording medium, which comprises tracking grooves and recording tracks interposed between the tracking grooves on the surface, the width of the recording tracks in a specific region being larger than that in another region.

The present invention further provides a substrate for an optical recording medium, which comprises tracking grooves and recording tracks interposed between the tracking grooves, the depth of the tracking grooves in a specific region being smaller than that in another region.

The present invention further provides a substrate for an optical recording medium, which comprises tracking grooves and recording tracks interposed between the tracking grooves on the surface, the width of the recording tracks in a specific region being larger than that in another region and the depth of the tracking grooves in the specific region being smaller than that in the another region.

The present invention further provides a process for producing a stamper for molding a substrate for an optical recording medium comprising tracking grooves and recording tracks interposed between the tracking grooves on the surface, the depth of the tracking grooves in a specific region being smaller than in another region, which comprises:

a) a step of forming a photoresist layer on a substrate for a master,
b) a step of exposing the photo-resist layer to a converged laser beam by scanning in accordance with the pattern of the tracking grooves,
c) a step of developing the photo-resist layer after the light exposure, thereby forming the master, and
d) a step of forming an electroconductive layer on the photoresist layer-formed surface of the master, then electrodepositing a metallic layer onto the electroconductive layer, thereby integrating the electroconductive layer with the metallic layer and then separating the metallic layer from the master, where the power of the converged laser beam for the pattern light exposure in accordance to the tracking grooves in the specific region is modulated to a lower level than that of the converged laser beam for the pattern light exposure in accordance with the tracking grooves in the other region in the step (b) of the light exposure.

The present invention further provides a process for producing a stamper for molding a substrate for an optical recording medium comprising tracking grooves and recording tracks interposed between the tracking grooves, the width of the recording tracks in a specific region being larger than that in another region, which comprises:

a) a step of forming a photoresist layer on a substrate for a master,
b) a step of exposing the photoresist layer to a converged laser beam by scanning in accordance with the pattern of the trackings grooves,
c) a step of developing the photoresist layer after the light exposure, thereby forming the master, and
d) a step of forming an electrophotoconductive layer on the photoresist layer-formed surface of the master, then electro-depositing a metallic layer onto the electroconductive layer, thereby integrating the electroconductive layer with the metallic layer and then separating the metallic layer from the master, where the spot size of the converged laser beam for the pattern light exposure in accordance with the tracking grooves in the specific region is made smaller than the spot size of the converged laser beam for the pattern light exposure in accordance with the tracking grooves in the other region.

BRIEF DESCRIPTION OF THE DRAWINGS

FIGS. 9A-1, 9A-2 and 9A-3 are cross-sectional views of the data region and the prepit region of the conventional optical recording medium and the prepit region of the present optical recording medium, respectively.

DETAILED DESCRIPTION OF THE PREFERRED EMBODIMENTS

The present invention will be explained in detail below, referring to the accompanying drawings.

Figure 1:
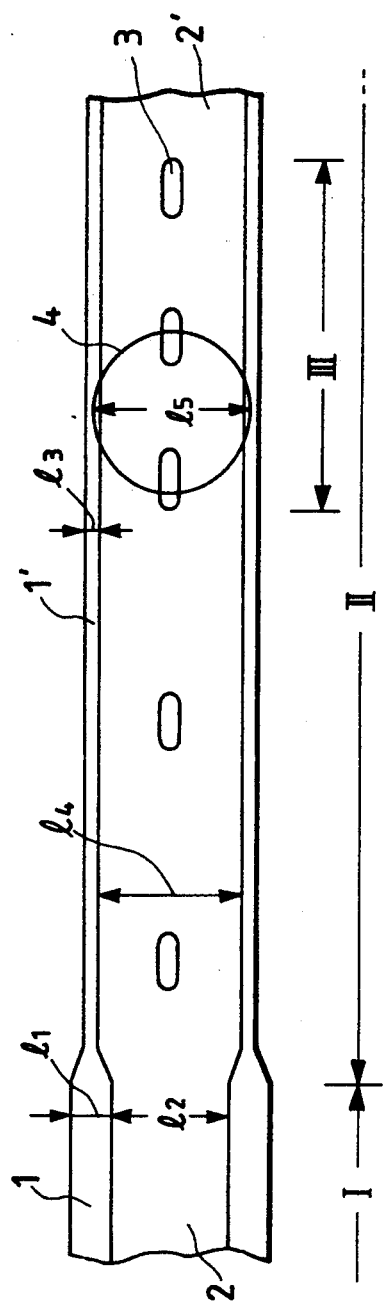
FIG. 1 is an enlarged plan view of a prepit region of one embodiment of an optical recording medium according to the present invention.
Figure 2:
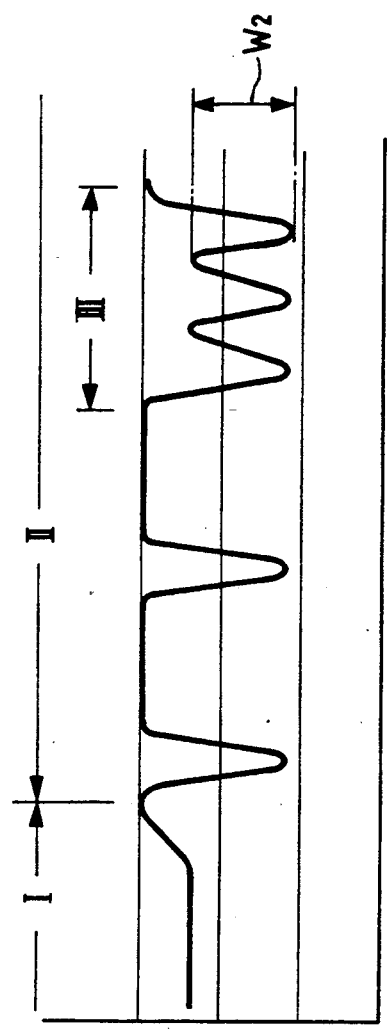
FIG. 2 is a schematic diagram showing a signal output in the prepit region of the optical medium shown in FIG. 1.

FIG. 1 is an enlarged plan view of a prepit region in one embodiment of an optical recording medium according to the present invention, and FIG. 2 is a diagram showing signal outputs (reflected light quantity) in the prepit region.

In FIG. 1, I is a data region, II a prepit region and III a closest pit region in the prepit region, and numeral 1 is a groove as a tracking track, 1' a groove formed in the prepit region II, and 3 is a prepit formed in a recording track 2. Width $l_3$ of groove 1' is so set that width $l_4$ of recording track 2' in the prepit region II may be larger than width $l_2$ of recording track 2 in the data region I, where $l_4 < l_5$ (light spot size), whereby the area occupied by the groove in a light spot 4 for irradiating the recording track can be reduced and consequently a decrease in the quantity of reflected light can be prevented even if an interference occurs between the diffracted, reflected light and the zero-ordered diffracted light in the groove. As a result, the desired quantity of reflected light can be maintained between the prepits in the prepit region, particularly in the closest pit region III, as shown in FIG. 2, and thus sufficient signal outputs can be obtained.

By maintaining relations between the width $l_2$ of recording track 2 and the width $l_4$ of recording track 2' in a ratio $l_2/l_4$ of 0.7 to 1.0, particularly 0.7 to 0.8 in such a range that $l_4$ may not exceed $l_5$ in the present invention, a decrease in the signal outputs of prepits, and the reflected light quantity particularly between the pits in the closest pit region can be preferably suppressed. In the present invention, the light spot size has such a diameter that the intensity of light beam is $1/e^2$ of the intensity at the center.

Figure 7:
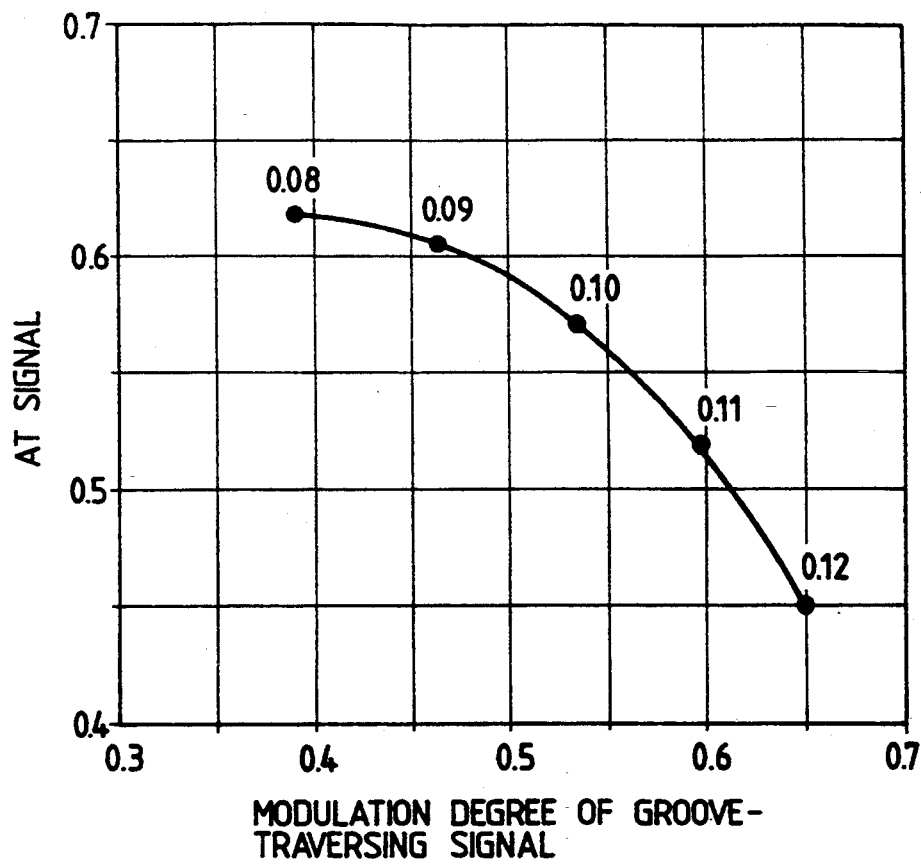
FIG. 7 is a schematic diagram showing relations between the tracking error signal, the modulation degree of groove-traversing signal, and the groove depth.
Figure 10:
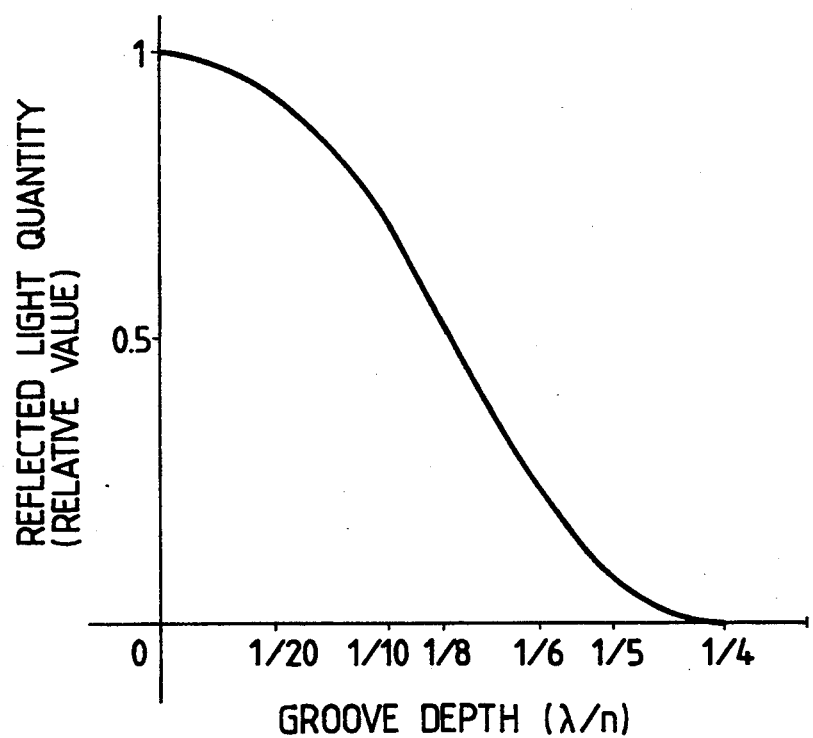
FIG. 10 is a schematic diagram showing the relation between the groove depth and the quantity of reflected light.

In the present invention, the depth of groove 1 is set to be smaller than $\lambda/4n$, but larger than $\lambda/8n$. That is, when grooves are used as tracking tracks, it is known that the tracking error signal will be a maximum when the depth of grooves is set to $\lambda/8n$ (where n: refractive index of a substrate; $\lambda$: wavelength of recording and/or reproducing light beam), as shown in FIG. 10, but the modulation degree of the groove-traversing signal for discriminating the recording tracks from the grooves is lowered during the track seeking, when the depth of groove is made smaller than $\lambda/4n$, which provides a maximum modulation degree of diffraction, as shown in FIG. 7, and thus it is desirable to set the depth of the groove a little larger than $\lambda/8n$, specifically to $\lambda/5n$ to $\lambda/7n$, particularly preferably $\lambda/5n$ to $\lambda/6n$.

In the foregoing embodiment, it is preferable to set the relations between the width $l_1$ of groove 1 and the width $l_3$ of groove 1' to that represented by the following relationship (1), particularly (2):

$$0.60 \leq l_3/l_1 \leq 0.95 \quad (1)$$

$$0.7 \leq l_3/l_1 \leq 0.95 \quad (2)$$

That is, in the case of decentering an objective lens to conduct microseeking, etc. in the tracking according to the push-pull method, a light spot will be displaced even on 2D-PD, and a DC offset that fails to make an AT signal zero is generated even if the light spot is at the track center. To solve the problem, adjustment is made, for example, by subtracting the offset quantity from the AT signal. The proportion of the offset quantity to the AT signal is proportional to the amplitude of AT signal, when the decentering degree of an objective lens and the groove shape are constant. When the push-pull method is used in the tracking of the conventional optical recording medium, on the other hand, the reflected light diffracted at the prepit in the prepit region interferes with the reflected light in another region of the recording track, resulting in a reduction of quantity of reflected light and thus there is a tendency for a decrease to occur in the amplitude of the tracking error signal (AT signal). Thus, there are still such problems that the offset quantity is less in the prepit region than in the data region, resulting in a difference in the offset quantity between these two regions, whereas the offset adjustment in the data region gives rise to an offset in the prepit region (these phenomena will be referred to as "leak-in").

When the width $l_3$ of groove 1' in the prepit region is made so small as to satisfy the foregoing relation, the ratio of the offset quantity to the amplitude of AT signal can be increased in the prepit region II, as compared with that in the data region I, and thus the difference in the offset quantity can be made substantially zero between the data region and the prepit region even if the amplitude of AT signal is decreased in the prepit region as in the foregoing, whereby the offset can be surely adjusted. This is because the diffraction efficiency of the light beam due to the grooves can be lowered by decreasing the groove width and the ratio of zero-ordered diffracting light on 2D-PD to first-ordered diffraction light can be increased, resulting in an increase in the ratio of the offset quantity to the amplitude of AT signal.

Figure 3:
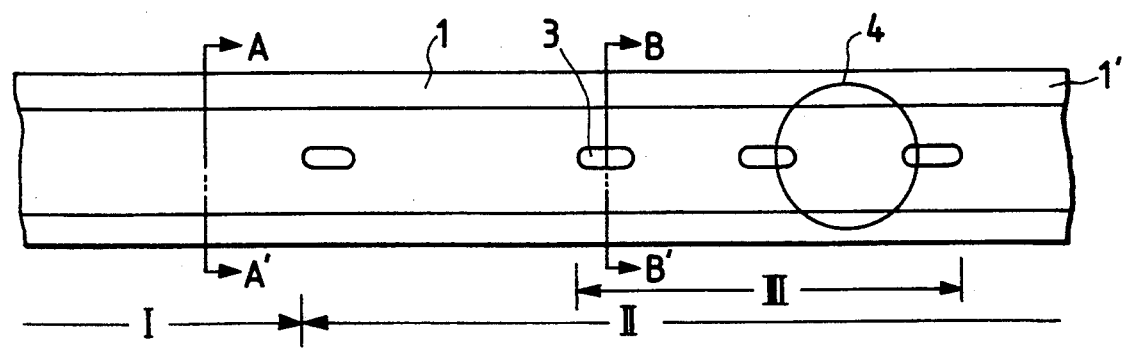
FIG. 3 is an enlarged plan view of a prepit region of another embodiment of an optical recording medium according to the present invention.
Figure 4:
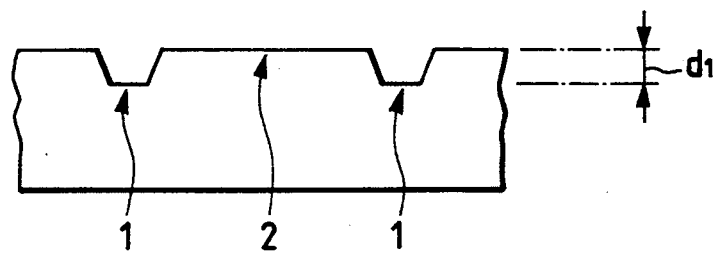
FIG. 4 is a cross-sectional view in the direction vertical to the track in the data region of the optical recording medium shown in FIG. 3.
Figure 5:
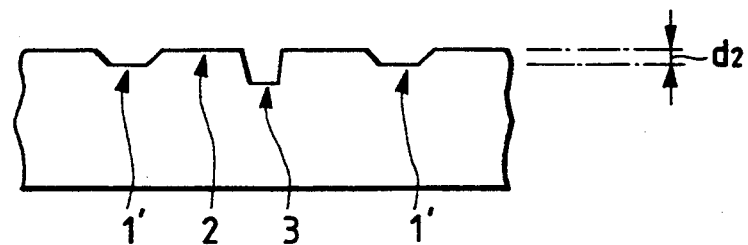
FIG. 5 is a cross-sectional view of the closest provided prepit region of the optical recording medium shown in FIG. 3.

FIG. 3 is a plan view showing a second embodiment of an optical recording medium according to the present invention and FIGS. 4 and 5 are schematic cross-sectional views along the lines A—A' and B-B' of FIG. 3, respectively, where numeral 1 is a groove in the data region I, 1' a groove in the prepit region II, and 3 is a prepit formed on a recording track 2.

Figure 6:
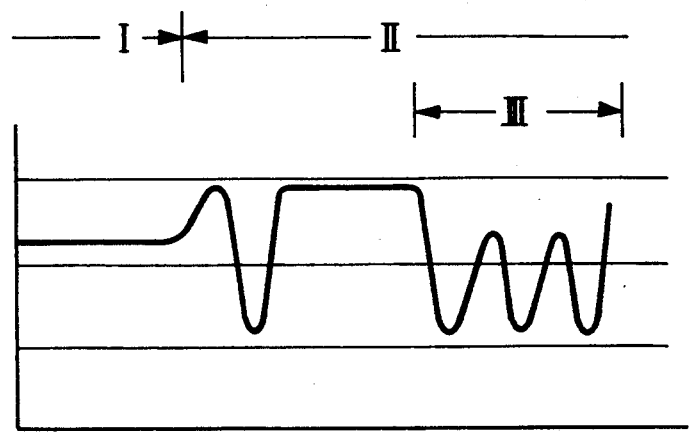
FIG. 6 is a schematic diagram showing signal outputs in the prepit region of the optical recording medium shown in FIG. 3.

In the second embodiment, groove 1' is so formed that the depth $d_2$ may be smaller than that $d_1$ of groove 1 in the data region, as shown in FIGS. 4 and 5. That is, in the second embodiment, the interference can be decreased between the diffracted, reflected light by groove 1' and the zero-ordered diffracted light in the prepit region II, and thus the reduction in the quantity of reflected light can be suppressed and the decrease in the amplitude of the quantity of reflected light can be suppressed between the prepits in the prepit region, for example, the closest pit region III, as shown in FIG. 6, whereby a sufficient signal output of prepits can be maintained.

In the case of an optical recording disk having a preformat with the width of groove 1: 0.5 mm and track pitch: 1.6 $\mu$m, where recording and reproduction are carried out with a light beam having a wavelength $\lambda$ and a spot size of 1.5 $\mu$m, it is known that a maximum tracking error signal can be obtained in the second embodiment when the depth $d_1$ of group 1 is $\lambda/8n$ (n: refractive index of the substrate). When the depth of the groove is made smaller from $\lambda/4n$ which gives the maximum modulation degree, the modulation degree of the groove-traversing signal for use in the discrimination of recording tracks from the groove at the track seeking is lowered, as shown in FIG. 7, and thus it is preferable to set the depth of the groove to be a little larger than $\lambda/8n$, and more specifically $\lambda/5n$ to $\lambda/7n$, preferably $\lambda/5n$ to $\lambda/6n$.

Figure 8A:
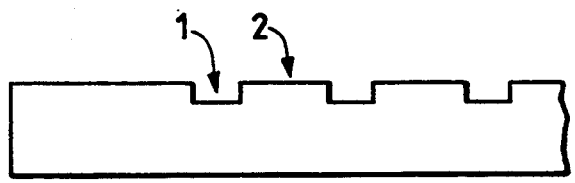
FIGS. 8A and 8B are schematic diagrams for explaining the modulation degree of a groove-traversing signal.
Figure 8B:
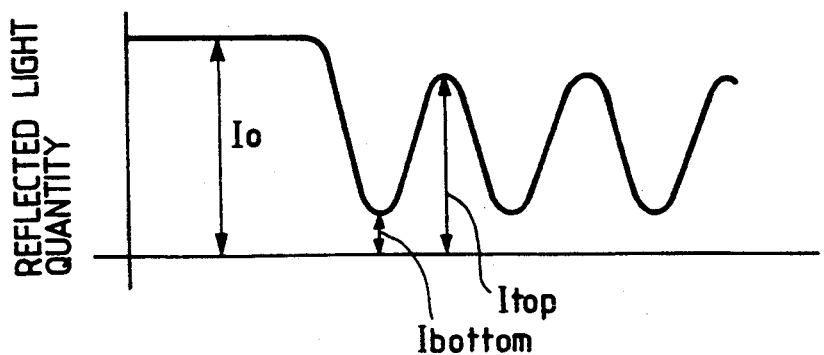

It is preferable to set the depth $d_2$ of groove 1' in the prepit region II to be smaller than at least $d_1$, and when $d_2$ is set to about $\lambda/8n$, and a sufficient quantity of reflected light can be obtained between the prepits in the prepit region, particularly the closest prepit region III, without any substantial occurrence of tracking errors. The modulation degree of a groove-traversing signal can be represented by $(I_{top} - I_{bottom})/I_0$, where $I_{top}$ is the quantity of reflected light at the recording track, $I_{bottom}$ the quantity of reflected light at the groove and $I_0$ is the quantity of reflected light at the mirror surface and changes in the quantity of reflected light observed when a light spot is scanned in the groove-traversing direction, are shown in FIGS. 8A and 8B.

Figures 1, 9A:
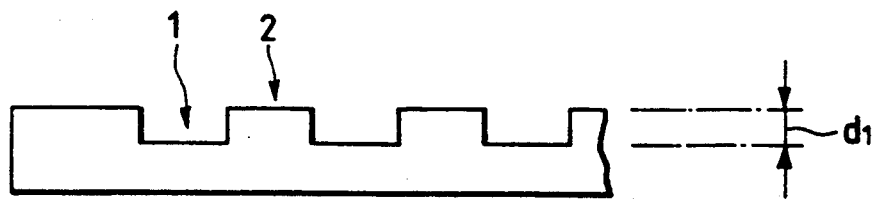
Figures 2, 9A:
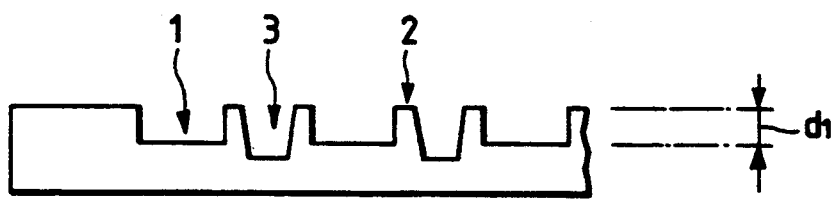
Figures 3, 9A:
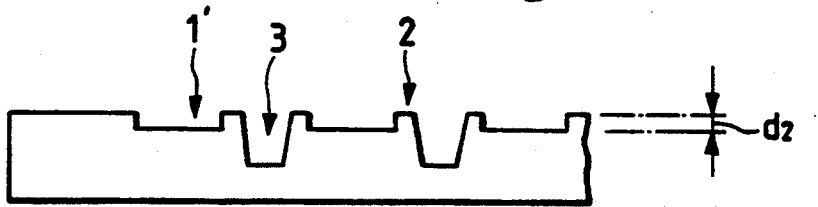
Figure 9B:
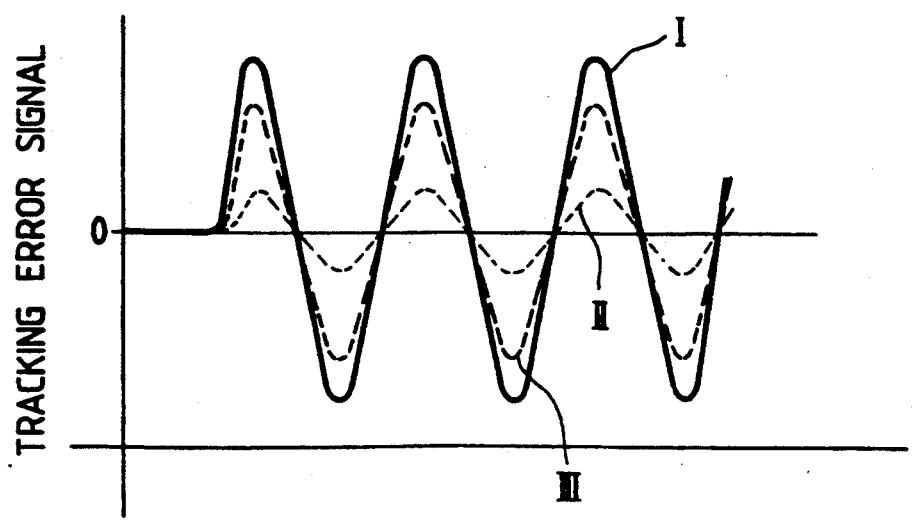
FIG. 9B is a schematic diagram showing relations of tracking error signals in each of those regions.

In the foregoing embodiment, it is particularly preferable to set $d_2$ to $\lambda/6n$ to $\lambda/8n$. That is, when the depth of groove in the data region and that in the prepit region are both set to be larger than $\lambda/8n$ in the push-pull method, as shown in FIGS. 9A-1, 9A-2 and 9A-3, the reflected light diffracted at the prepit interferes with the reflected light at other part in the recording track region, resulting in a decrease in the quantity of reflected light, whereas since the depth of the groove in the groove region is also set to be larger than $\lambda/8n$, the quantity of reflected light is lower. That is, there is a tendency for the amplitude of the tracking error signal (AT signal) to be decreased. For example, when a light head is moved to a specific recording track, generally the number of recording tracks traversed is determined by counting AT signals. Lower AT signals only in the prepit region at that time is liable to cause errors such as miscounting, etc. However, by setting $d_2$ to the foregoing range as shown in FIG. 9AIII, the quantity of reflected light at the groove is increased to prevent lowering of the amplitude of AT signals in the prepit region, thereby providing an optical recording disk capable of providing AT signals with an even amplitude throughout the entire surface of the disk. At that time the modulation degree of the groove-traversing signal in the prepit region is lowered, but this is not a problem, since the groove-traversing signals in the prepit region are usually not used intentionally by taking some steps on the driving unit side, because the modulation degree of the groove-traversing signal is considerably reduced by the influence of prepits themselves and the necessary time is very short.

When the depth $d_2$ of groove 1' is set to the foregoing range, a decrease in the amplitude of the AT signal can be prevented, and the depth of the prepit can be made smaller within such a range as not to deteriorate the diffraction effect of the light beam. That is, the mechanism of the lowering the amplitude of AT signal in the prepit region can be explained as follows: since the prepits are positioned with a deviation of just 180° from the groove pitch, the push-pull signal by the diffraction only at the prepits takes just a reversed phase to the AT signal by diffraction only at the groove. Thus, the push-pull signal by the diffraction only at the prepits acts to cancel the AT signal by the diffraction only at the groove, whereby a decrease in the amplitude of AT signal is caused in the prepit region. Since the depth for most effectively outputting the push-pull signal is $\lambda/8n$, the push-pull signal by the diffraction only at the prepits can be increased as the depth of prepits is smaller within the range up to $\lambda/8n$, and thus the amplitude of AT signal will be lowered. That is, the depth of prepits cannot be shortened according to the prior art from the viewpoint of ensuring the necessary contrast of the prepit signal as well as preventing the amplitude of the AT signal from being lowered.

In the second embodiment of the present invention, on the other hand, the reflected light quantity in the groove region can be secured by making the depth of the groove smaller (see FIG. 10), and thus not only the prepit signal, but also the AT signal in the prepit region can be improved. Thus, the depth of prepits can be made smaller, for example, by about 100 to about 200 μm. In case of having a smaller depth of the prepits, the shape of the prepit region on a stamper can be effectively transferred to a disk substrate with a higher precision, for example, by molding, such as injection molding.

When the relation between $d_1$ and $d_2$ is exactly set to $0.80 \leq d_2/d_1 \leq 0.95$ in the foregoing second embodiment, the "leak-in" to the AT signal in the prepit region can be prevented and an AT signal of high quality can be obtained. That is, by making the depth of groove smaller toward $\lambda/8n$ in the second embodiment, the amplitude of the AT signal can be increased, and a ratio of the zero-ordered diffracted light to the first-ordered diffracted light on 2D-PD can be increased due to a decrease in the diffraction efficiency by smaller groove depth, and thus the proportion of the offset quantity to the amplitude of the AT signal can be abruptly increased. The difference in the offset quantity between the prepit region and the data region can be made substantially negligibly small by making the depth of the groove in the prepit region smaller, as set above, relative to the depth of groove in the data region. At that time, an optical recording disk can be obtained which is capable of outputting signals of high quality with an improved prepit signal and improved amplitude of the AT signal in the prepit region can be obtained.

Another embodiment of the present optical recording medium will be explained below.

Figure 11A:
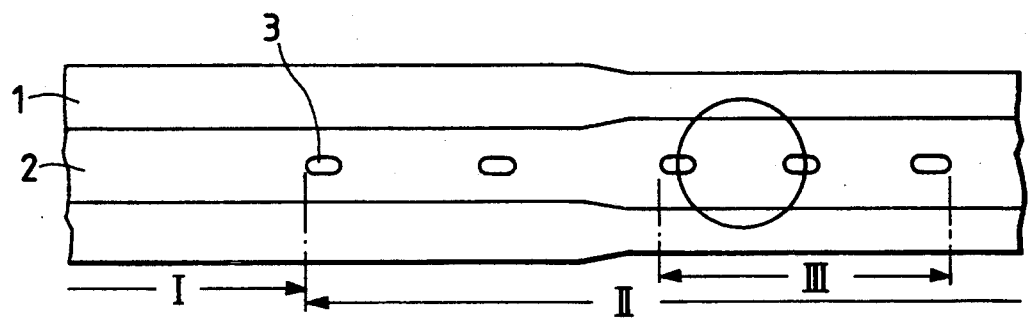
FIGS. 11A and 11B are schematic views of a further embodiment of an optical recording medium according to the present invention.
Figure 11B:
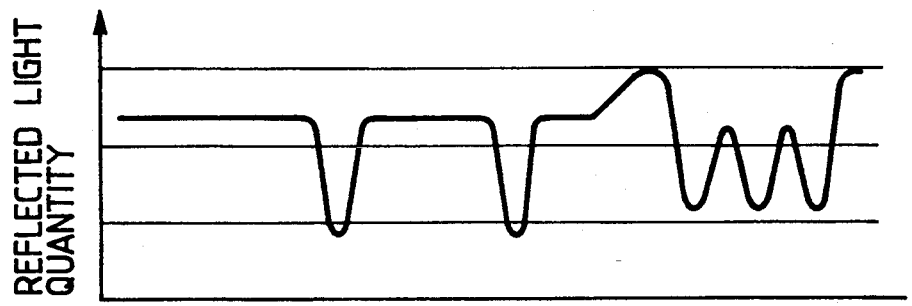

FIG. 11A is a partially enlarged, plan view of another embodiment of the present optical recording medium, and FIG. 11B shows signal outputs when a substrate is formed into the shape of FIG. 11A. In the optical recording medium of FIG. 11A, the grooves only in the closest pit region III in the prepit region are narrowed, where the signal output in the shortened pit pitch region can be also increased in contrast to the conventional optical recording medium.

Figure 12A:
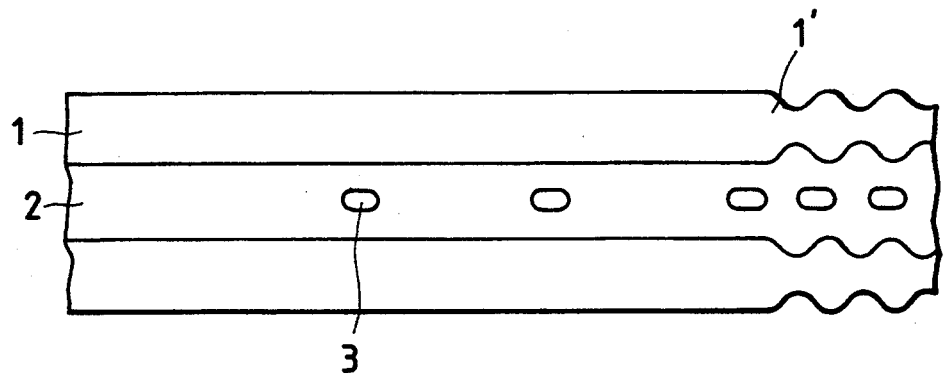
FIGS. 12A and 12B are a schematic view and a schematic diagram of a still further embodiment of an optical recording medium according to the present invention, respectively.
Figure 12B:
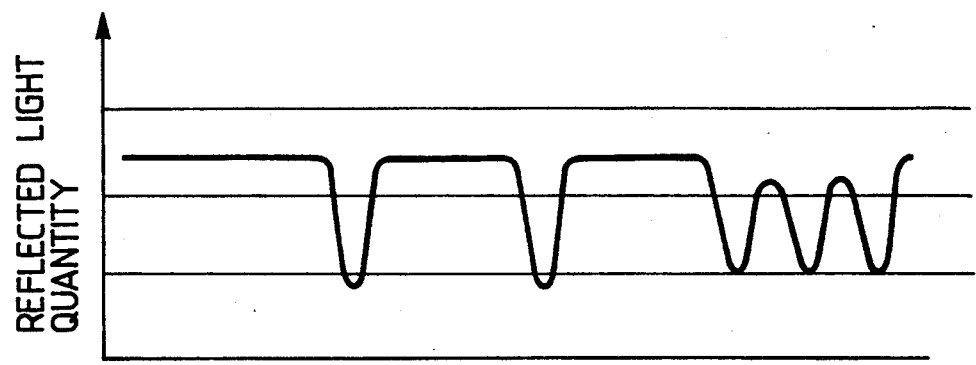

FIG. 12A is an enlarged plan view of a further embodiment of the present optical recording medium, where the grooves only in the region corresponding to the parts between the pits in the closest prepit region III are narrowed and the width of the recording track are correspondingly enlarged. Even with this structure, the signal outputs in the shortened pit pitch region can be also increased, as shown in FIG. 12B, in contrast to the conventional optical recording medium.

In the embodiments shown in FIGS. 11 and 12, the depth of the grooves may be made smaller in place of narrowing the grooves (widening the recording track) in the prepit region, and in the embodiments shown in FIGS. 3, 11 and 12 the grooves may be made both narrower and shallower in the prepit region.

A process for producing such an optical recording medium according to the present invention will be explained below:

In the ordinary process for producing a master by exposing a glass disk coated with a photoresist to a laser beam, followed by development to form grooves 1 and prepits 3, a master having a pattern corresponding to a preformat shown in FIGS. 1, 3, 11 or 12 can be produced by lowering the output of the laser beam for forming grooves 1 in the prepit region. Then, the master surface is made electroconductive, and a metallic film is deposited thereon by electroplating. Then, the master is removed from the metallic film thereby to obtain a stamper. With the thus obtained stamper, a substrate for the present optical recording medium can be obtained by molding according to a well known molding method for a substrate for an optical recording medium, for example, an injection method, a 2P method, a mold casting method or a compression method. Then, an optomagnetic recording layer such as an amorphous thin film of Tb-Fe-Co or an organic recording layer containing an organic pigment is formed on the substrate, and then, a reflecting film, a protecting substrate or a protective film is formed thereon, when required, whereby an optical recording medium can be obtained.

In the foregoing step of preparing a stamper, a stamper capable of molding a substrate for an optical recording medium with a narrow tracking groove width in the prepit region can be obtained by making the beam size smaller in the prepit region at the exposure of the photoresist to the laser beam. That is, such a stamper can be obtained, for example, by overlapping two beams, thereby enlarging a spot size on the photoresist surface, when the photoresist is exposed to light in a pattern corresponding to the tracking grooves in the data region on one hand and by eliminating one of the two beams in the prepit region, thereby making the spot size smaller, when the photoresist is exposed to light in a pattern corresponding to the tracking groove in the prepit region.

Figure 13:
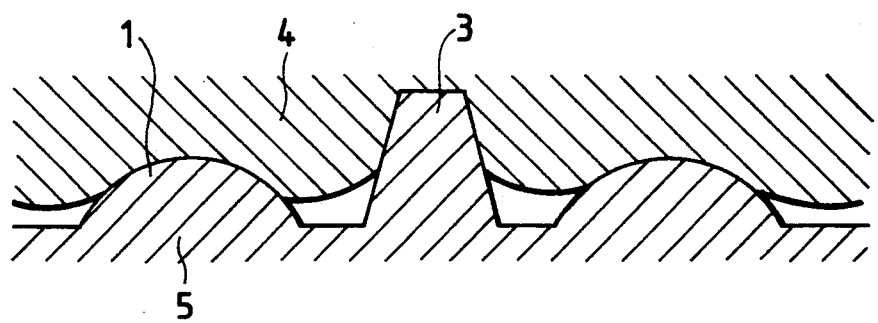
FIG. 13 is a schematic cross-sectional view of the injection molding of an optical recording medium according to the present invention.
Figure 14:
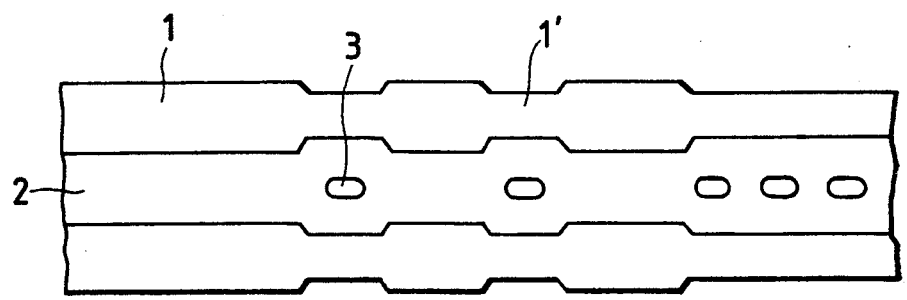
FIG. 14 is an enlarged plan view of an optical recording medium produced in the manner shown in FIG. 13.
Figure 15:
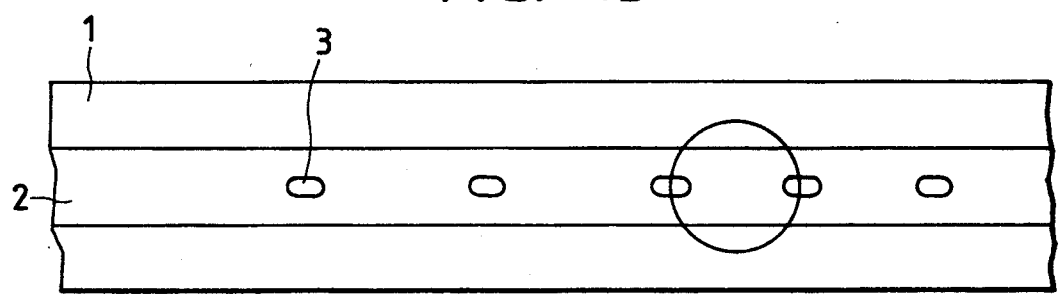
FIG. 15 is an enlarged plan view of the prepit region of the conventional optical recording medium.
Figure 16:
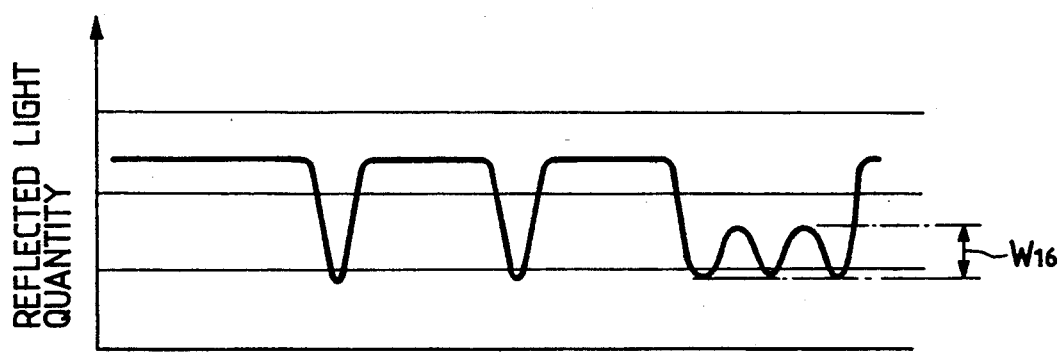
FIG. 16 is a schematic diagram showing signal outputs in the prepit region of the optical recording medium shown in FIG. 15.

According to another embodiment of the present process for producing the present optical recording medium, a substrate for an optical recording medium can be also prepared by adjusting injection molding conditions, thereby lowering the transfer ratio. That is, FIG. 13 shows a schematic cross-sectional view of a stamper 5 and resin 4 in the transfer state at the injection molding, where a prepit pattern 3 is at a higher level than that of groove pattern 1, and thus when the transfer ratio is lowered by adjusting the injection molding conditions, for example, by lowering a stamper temperature, that is, by setting a mold temperature to about 90° C. in case polycarbonate is used as the resin, the grooves near the prepits 3 on the thus molded substrate can be made narrower and shallower, as shown in FIG. 14.

As explained in the foregoing, the present invention can provide an optical recording medium capable of outputting a prepit reproduced signal with a good and even S/N ratio without any decrease in the signal output in the shortened prepit pitch region by making the grooves in the prepit region narrower or shallower, while preventing any "leak-in" to the AT signal in the prepit region.

Furthermore, the present invention can provide an optical recording medium capable of improving signal outputs of prepits, while preventing a decrease in the amplitude of the tracking error signal by making the grooves in the prepit region shallower, and outputting prepit reproduced signals with a good and an even S/N ratio and also outputting AT signals of even and high quality.

In the present invention, the closest prepit region means a region where prepits are so formed that the distance between adjacent prepits is less than the spot size of the light beam.

PREFERRED EMBODIMENTS OF THE INVENTION

The present invention will be explained in detail below, referring to Examples.

Reference Example 1

A conventional optomagnetic disk, which serves as a standard for evaluation in the present invention was prepared in the following manner.

At first, a stamper was prepared as follows:

A glass disk, 250 mm in diameter and 10 mm thick, was coated with a photoresist (AZ-1300SF, trademark of a product made by Hoechst Japan) to a thickness of 2,000 Å by spin coating. Then, the doughnut region, 128 mm in outer diameter and 58 mm in inner diameter, of the resist master was exposed to light in accordance with a pattern having a spiral groove for an optical disk, 0.5 μm in width 1.6 μm in pitch and 900 Å in depth and a closest prepit region comprising group of pits, 0.9 μm in length, 1.750 Å in depth and 1.6 μm in pitch, each formed on a data recording track interposed between the grooves and in parallel to the grooves at a radius r of 35 mm by a laser cutter, while turning the resist master at 900 rpm. For cutting of groove pattern corresponding to the prepit region, laser power for the exposure was 15 mW at a radius of 35 mm.

After development, a Ni film was formed on the resist pattern to a thickness of 1,000 Å by sputtering, and then Ni was further deposited thereon to a thickness of 300 μm by electroplating. Then, the Ni film was separated from the resist master to obtain a stamper. With the stamper, an optical disk substrate of polycarbonate, 130 mm in diameter and 1.2 mm in thickness, having a preformat shown in FIG. 1 was prepared by injection molding. Mold temperature in the injection molding machine was 95° C. at the molding.

The thus prepared optical disk substrate was inspected with an electron microscope. It was found that the width of the recording track was 0.95 μm in both the data region and the prepit region, and the depth and width of the tracking grooves were 900 Å and 0.65 μm, respectively in both the data region and the prepit region.

Then, a $SiO_2$ protective film, a Tb-Fe-Co amorphous thin film and a $SiO_2$ protective film were formed successively on the surface on the preformat transfer side of the optical disk substrate by sputtering, and then a rubber based hot melt adhesive (Meltlon 3S42, trademark of a product made by Diabond K. K., Japan) was applied thereto. Then, a protective substrate of polycarbonate, 130 mm in diameter and 1.2 mm in thickness, was pasted thereon to prepare an optomagnetic disk.

Then, the optomagnetic disk was mounted on an optomagnetic disk drive (wavelength: 830 nm; $l_5$:1.5 μm) and prepits on the recording track at the position near r=35 mm were subjected to reproduction.

Contrast of prepit-reproduced signals in the closest prepit region, contrast of tracking error signals (AT signals) in the data region and the closest prepit region (modulation degree of groove-traversing signal) and offset quantity to the contrast of the AT signals in the closest prepit region were measured at that time.

The contrast of the prepit signals is represented by the following formula:

$$(V_2-V_3)/V_1$$

where $V_1$ is a DC output voltage on a pit-free mirror surface, $V_2$ is a maximum output voltage when the reproducing beam spot is between the pits, and $V_3$ is a minimum output voltage when the reproducing beam spot is on a pit in the waveform obtained by normally actuating the tracking servo mechanism of the disk drive and observing the reproduced signals by a digital storage oscilloscope (RTD 710:trademark of a product made by Sony Tectronics K. K., Japan) while making the reproducing beam spot exactly trace the recording track.

The results are shown in Table 1.

TABLE 1

| Region Ref. Ex. 1 | Contrast of prepit-reproduced signals | Contrast of AT signals | Offset quantity |
| --- | --- | --- | --- |
| Data region (I) | — | 0.65 | — |
| Closest prepit region (III) | 0.25 | 0.3 | 0.2 |

Example 1

A stamper was prepared at first in the following manner.

A glass disk, 250 mm in diameter and 10 mm in thickness, was coated with a photoresist (AZ-1300 SF, trademark of a product made by Hoechst Japan) to a thickness of 2,000 Å by spin coating. Then, the doughnut region, 128 mm in outer diameter and 58 mm in inner diameter, of the resist master was exposed to light in accordance with a pattern having a spiral groove for an optical disk, 0.5 μm in width, 1.6 μm in pitch and 900 Å in depth and a closest prepit region comprising groups of pits, 0.9 μm in length, 1,750 Å in depth and 1.6 μm in pitch, each formed on a data recording track interposed between the grooves and in parallel to the grooves at a radius r of 35 mm by a laser cutter, while turning the resist master at 900 rpm. For cutting of the groove pattern corresponding to the prepit region, laser power for the exposure was switched to 13.5 mW from 15 mW at a radius of 35 mm.

After development, a Ni film was formed on the resist pattern to a thickness of 1,000 Å by sputtering, and then Ni was further deposited thereon to a thickness of 300 μm by electroplating. Then, the Ni film was separated from the resist master to obtain a stamper. With the stamper, an optical disk substrate of polycarbonate, 130 mm in diameter and 1.2 mm in thickness, having a preformat shown in FIG. 1 was prepared by injection molding. Mold temperature in the injection molding machine was 95° C. at the molding.

The depth $d_1$ of tracking groove of the substrate in the data region was 900 Å, and the depth $d_2$ of tracking groove in the prepit region was 765 Å.

Then, a $SiO_2$ protective film, a Tb-Fe-Co amorphous thin film and a $SiO_2$ protective film were formed successively on the surface on the preformat transfer side of the optical disk substrate by sputtering, and then a rubber-based hot melt adhesive (Meltlon 3S42, trademark of a product made by Diabond K. K., Japan) was applied thereto. Then, a protective substrate of polycarbonate, 130 mm in diameter and 1.2 mm in thickness, was pasted thereon to prepare an optomagnetic disk.

Then, the optomagnetic disk was mounted on an optomagnetic disk drive (wavelength: 830 nm; $l_5$:1.5 μm) and prepits on the recording track at the position near r=35 mm were subjected to reproduction.

The contrast of the prepit-reproduced signals and the contrast of the tracking error signals (AT signals) in the closest prepit region (modulation degree of groove-traversing signals), and the offset quantity to the contrast of the AT signals in the closest prepit region were measured at that time in the same manner as in Reference Example 1.

Examples 2 to 5

Optomagnetic disks were prepared in the same manner as in Example 1, except that the depth of tracking groove in the prepit region was changed in Example 1, as shown in Table 2 and evaluated in the same manner as in Example 1.

TABLE 2

| Example No. | Groove depth ($d_1$) in the data region | Groove depth ($d_2$) in the closest prepit region | Recording track width ($l_2$) in the data region | Recording track width ($l_4$) in the closest prepit region |
| --- | --- | --- | --- | --- |
| 1 | 900 Å | 765 Å | 0.95 μm | 0.95 μm |
| 2 | 900 | 720 | 0.95 | 0.95 |
| 3 | 900 | 855 | 0.95 | 0.95 |
| 4 | 900 | 660 | 0.95 | 0.95 |
| 5 | 900 | 675 | 0 | 0.95 |

Evaluation results of the optomagnetic disks of Examples 1 to 5 are shown in Table 3, and evaluation standards are shown in Table 4.

TABLE 3

| Example No. | Region | Contrast of prepit-reproduced signals | Contrast of AT signals | Offset quantity |
| --- | --- | --- | --- | --- |
| 1 | Closest prepit region (III) | B | B | AA |
| 2 | (III) | A | A | A |
| 3 | (III) | A | A | A |
| 4 | (III) | AA | AA | B |
| 5 | (III) | AA | AA | B |

TABLE 4

| Evaluation | AA | A | B |
| --- | --- | --- | --- |
| Contrast of prepit-reproduced signals | 0.3 or more | 0.27 or more and less than 0.3 | 0.25 or more and less than 0.27 |
| Contrast of AT signals | 0.65 or more | 0.5 or more and less than 0.65 | 0.3 or more and less than 0.5 |
| Offset quantity | less than 0.1 | 0.1 or more and less than 0.15 | 0.15 or more and less than 0.2 |

In the present invention, the offset quantity means a proportion of "leak-in" to the amplitude of the AT signals in the prepit region, where a smaller offset quantity means less offset in the prepit region.

Examples 6 to 8

Optomagnetic disks, as shown in FIG. 1, which had a recording track width ($l_2$) and a tracking groove width ($l_1$) in the data region and a recording track width ($l_4$) and a tracking groove width ($l_3$) in the prepit region, as shown in Table 5, were prepared in the same manner as in Example 1, except that stampers were prepared by making the spot size of the laser for photoresist exposure smaller in the prepit region in place of modulating the laser power to a low value in the data region and the prepit region in the step of preparing a stamper in Example 1.

TABLE 5

| Example No. | Groove width ($l_1$) in the data region | Groove width ($l_3$) in the closest prepit region | Recording track width ($l_2$) in the data region | Recording track width ($l_4$) in the closest prepit region |
| --- | --- | --- | --- | --- |
| 6 | 0.65 μm | 0.25 μm | 0.95 μm | 1.35 μm |
| 7 | 0.65 | 0.4 | 0.95 | 1.2 |

TABLE 5-continued

| Example No. | Groove width ($l_1$) in the data region | Groove width ($l_3$) in the closest prepit region | Recording track width ($l_2$) in the data region | Recording track width ($l_4$) in the closest prepit region |
|---|---|---|---|---|
| 8 | 0.65 | 0.6 | 0.95 | 1.0 |

The contrast of prepit-reproduced signals in the closest prepit region and the offset quantity in the closest prepit region of these optomagnetic disks were evaluated in the same manner as in Example 1. The evaluation results are shown in Table 6.

TABLE 6

| Example No. | Region | Contrast of prepit-reproduced signals | Offset quantity |
|---|---|---|---|
| 6 | Closest prepit region (III) | AA | B |
| 7 | (III) | A | A |
| 8 | (III) | B | AA |

Example 9

A stamper corresponding to a pattern with a depth and a width of the tracking groove being 900 Å and 0.65 μm, respectively, in both the data region and the prepit region was obtained without changing the light exposure of the data region, the power and the spot size, at the exposure of a pattern corresponding to the tracking groove in the prepit region during the preparation of a stamper in Example 1.

Then, a substrate for an optical disk was molded with the thus prepared stamper by injection molding in the same manner as in Example 1. Mold temperature was 90° C. to lower the transfer ratio from the stamper.

The thus obtained substrate for an optical disk was inspected with an electron microscope. It was found that the width of the recording track was wide in the prepit region and narrow in other regions, as shown in FIG. 14 and more specifically as shown in Table 7. The depth of the groove was found to be 800 Å in the prepit region and 900 Å in the other region.

Figure 17:
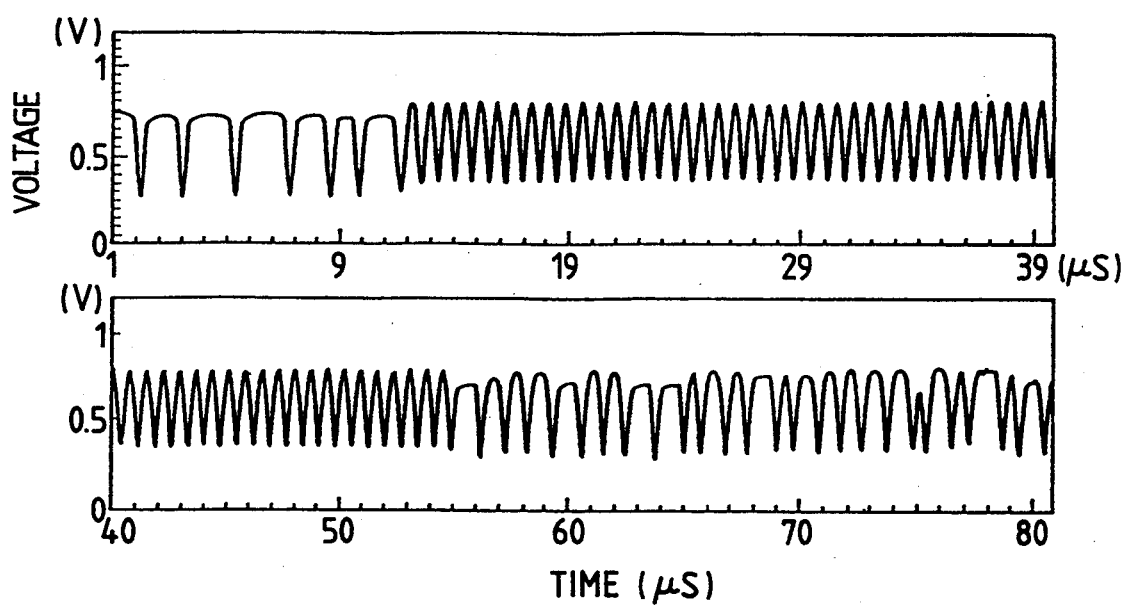
FIG. 17 is a graph showing reproduced signal outputs of an optomagnetic disk according to Example 9.

With the thus prepared substrate, an optical disk was prepared and evaluated in the same manner as in Example 1. The results are shown in Table 8, and signal outputs of the optical disk are shown in FIG. 17.

TABLE 7

| | $l_1$ | $l_3$ | $l_2$ | $l_4$ | $d_1$ | $d_3$ |
|---|---|---|---|---|---|---|
| Example 9 | 0.65 μm | 0.6 μm | 0.95 μm | 1.0 μm | 900 Å | 800 Å |

TABLE 8

| | Region | Contrast of prepit-reproduced signals | Contrast of AT signals | Offset quantity |
|---|---|---|---|---|
| Example 9 | Closest prepit region (III) | AA | A | AA |

Figure 18:
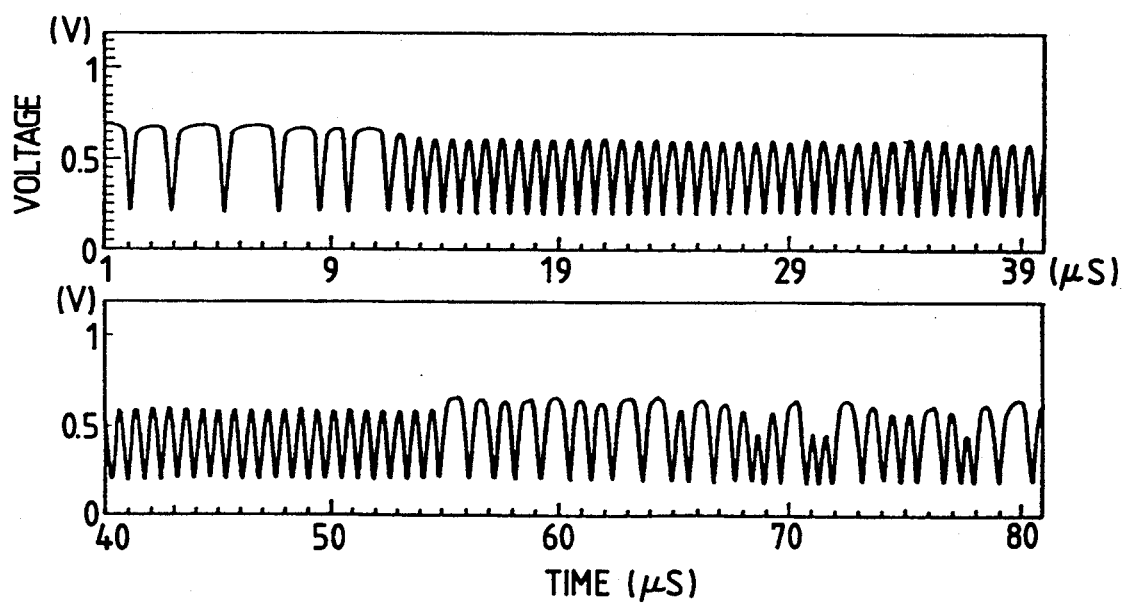
FIG. 18 is a graph showing reproduced signal outputs of an optomagnetic disk according to Reference Example 1.

Output signals of the optical disk of Reference Example 1 are shown in FIG. 18.

It is apparent from FIGS. 17 and 18 that the optical disk whose transfer ratio is lowered can produce signals of a higher level in the shortened prepit pitch region.

What is claimed is:

1. An optical recording medium which comprises: tracking tracks and recording tracks interposed between the tracking tracks, the width $l_3$ of the tracking tracks in a specific region and the width $l_1$ of the tracking tracks in another region have the following relationship:

$$0.60 \leq l_3/l_1 \leq 0.95,$$

the specific region being a prepit region provided with prepits on the recording track.

2. An optical recording medium according to claim 1, wherein the specific region is a closest prepit region.

3. An optical recording medium according to claim 1, wherein the width of the recording tracks in the specific region is smaller than the diameter of a light beam spot which a light beam for either recording or reproducing, or both recording and reproducing forms on a substrate surface.

4. An optical recording medium according to claim 1, wherein width $l_4$ of the recording tracks in the specific region and width $l_2$ of the recording tracks in the another region have the following relationship:

$$0.7 \leq l_2/l_4 \leq 1.0.$$

5. An optical recording medium according to claim 4, wherein the relationship is:

$$0.7 \leq l_2/l_4 \leq 0.8.$$

6. An optical recording medium according to claim 1, wherein the relationship is:

$$0.7 \leq l_3/l_1 \leq 0.95.$$

7. An optical recording medium according to claim 1, wherein the optical recording medium is used in a recording apparatus for detecting tracking errors by a push-pull method.

8. An optical recording medium according to claim 1, wherein the optical recording medium is used in a reproduction apparatus for detecting tracking errors by a push-pull method.

9. An optical recording medium according to claim 1, wherein the tracking tracks are grooves formed on a substrate.

10. An optical recording medium according to claim 9, wherein the depth of the grooves is set to be smaller than $\lambda/4n$, but larger than $\lambda/8n$, where $\lambda$ is the wavelength of an irradiating light beam irradiating the substrate and n is the refractive index of the substrate.

11. An optical recording medium according to claim 10, wherein the depth of the grooves is not more than $\lambda/5n$, but not less than $\lambda/7n$.

12. An optical recording medium according to claim 11, wherein the depth of the grooves is not more than $\lambda/5n$, but not less than $\lambda/6n$.

13. An optical recording medium according to claim 1, wherein the specific region is region between the prepits.

14. An optical recording medium according to claim 1, wherein said optical recording medium is an optomagnetic medium.

15. An optical recording medium according to claim 1, wherein a width $l_4$ of the recording tracks in the specific region is larger than a width $l_2$ of the recording tracks in the another region.

16. An optical recording medium which comprises: tracking grooves and recording tracks interposed between the tracking grooves, the depth $d_2$ of a groove in a specific region and the depth $d_1$ of a groove in another region having the following relationship:

$$0.80 \leq d_2/d_1 \leq 0.95,$$

the specific region being a prepit region provided with prepits on the recording track.

17. An optical recording medium according to claim 16, wherein the specific region is a closest prepit region.

18. An optical recording medium according to claim 16, wherein the optical recording medium is used in a recording apparatus for detecting tracking errors by a push-pull method.

19. An optical recording medium according to claim 16, wherein the optical recording medium is used in a reproduction apparatus for detecting tracking errors by a push-pull method.

20. An optical recording medium according to claim 16, wherein the grooves are formed on a substrate.

21. An optical recording medium according to claim 20, wherein the depth $d_1$ of the grooves in the another region satisfies the following relationship:

$$\lambda/8n \leq d_1 \leq \lambda/4n$$

wherein $\lambda$ is the wavelength of an irradiating light beam irradiating the substrate and n is the refractive index of the substrate.

22. An optical recording medium according to claim 21, wherein the depth $d_1$ satisfies the following relationship:

$$\lambda/7n \leq d_1 \leq \lambda/5n.$$

23. An optical recording medium according to claim 22, wherein the depth $d_1$ satisfies the following relationship:

$$\lambda/6n \leq d_1 \leq \lambda/5n.$$

24. An optical recording medium according to claim 16, wherein depth $d_2$ of the grooves in the specific region satisfies the following relationship:

$$\lambda/8n \leq d_2 \leq d_1.$$

25. An optical recording medium according to claim 24, wherein the depth $d_2$ satisfies the following relationship:

$$\lambda/8n \leq d_2 \leq \lambda/6n.$$

26. An optical recording medium according to claim 16, wherein the optical recording medium is a disk-type, optical recording medium.

27. An optical recording medium according to claim 16, wherein the specific region is region between the prepits.

28. An optical recording medium according to claim 16, wherein said optical recording medium is an opto-magnetic medium.

29. An optical recording medium which comprises: tracking grooves and recording tracks interposed between the tracking grooves, the width $l_3$ of a tracking groove in a specific region and the width $l_1$ of a tracking groove in another region having the following relationship:

$$0.60 \leq l_3/l_1 \leq 0.95,$$

and the depth $d_2$ of the groove in the specific region and the depth $d_1$ of a groove in the another region having the following relationship:

$$0.80 \leq d_2/d_1 \leq 0.95,$$

the specific region being a prepit region provided with prepits on the recording track.

30. An optical recording medium according to claim 29, wherein said optical recording medium is an opto-magnetic medium.

31. An optical recording medium according to claim 29, wherein the specific region is a closest prepit region.

32. An optical recording medium according to claim 29, wherein the width of the recording tracks in the specific region is smaller than the diameter of a light beam spot which a light beam for either recording or reproducing, or both recording and reproducing forms on a substrate surface of the recording medium.

33. An optical recording medium according to claim 29, wherein the width $l_4$ of the recording tracks in the specific region and the width $l_2$ of the recording tracks in the another region having the following relationship:

$$0.7 \leq l_3/l_4 \leq 1.0.$$

34. An optical recording medium according to claim 33, wherein the relationship of widths $l_2$ and $l_4$ is:

$$0.7 \leq l_2/l_4 \leq 0.8.$$

35. An optical recording medium according to claim 33, wherein the relationship of widths $l_3$ and $l_1$ is:

$$0.7 \leq l_3/l_1 \leq 0.95.$$

36. An optical recording medium according to claim 29, wherein said optical recording medium comprises means for being used in a recording apparatus for detecting tracking errors by a push-pull method.

37. An optical recording medium according to claim 29, wherein said optical recording medium comprises means for being used in a reproducing apparatus for detecting tracking errors by a push-pull method.

38. An optical recording medium according to claim 29, wherein the specific region is a region between prepits.

39. An optical recording medium according to claim 29, wherein the tracking grooves are formed on a substrate.

40. An optical recording medium according to claim 29, wherein the depth $d_1$ of the grooves in the another region satisfies the following relationship:

$$\lambda/8n \leq d_1 \leq \lambda/4n$$

wherein $\lambda$ is the wavelength of an irradiating light beam irradiating the optical recording medium and n is the refractive index of the substrate.

41. An optical recording medium according to claim 40, wherein the depth $d_1$ satisfies the following relationship:

$$\lambda/7n \leq d_1 \leq \lambda/5n.$$

42. An optical recording medium according to claim 41, wherein the depth $d_1$ satisfies the following relationship:

$$\lambda/6n \leq d_1 \leq \lambda/5n.$$

43. An optical recording medium according to claim 29, wherein the depth $d_2$ of the groove in the specific region satisfies the following relationship:

$$\lambda/8n \leq d_2 \leq d_1.$$

44. An optical recording medium according to claim 29, wherein the depth $d_2$ of the groove in the specific region satisfies the following relationship:

$$\lambda/8n \leq d_2 \leq \lambda/6n.$$

45. An optical recording medium according to claim 29, wherein the optical recording medium is a disk-type optical recording medium.

46. An optical recording medium according to claim 29, wherein a width $l_4$ of the recording tracks in the specific region is larger than width $l_2$ of the recording tracks in the another region.

47. A substrate for an optical recording medium which comprises: tracking tracks and recording tracks interposed between the tracking tracks, the width $l_3$ of the tracking tracks in a specific region and the width $l_1$ of the tracking tracks in another region having the following relationship:

$$0.60 \leq l_3/l_1 \leq 0.95 \;/\!-\!13\!-$$

the specific region being a prepit region provided with prepits on the recording track.

48. A substrate for an optical recording medium, which comprises: tracking grooves and recording tracks interposed between the tracking grooves, the depth $d_2$ of a groove in a specific region and the depth $d_1$ of the groove in the another region having the following relationship:

$$0.80 \leq d_2/d_1 \leq 0.95,$$

the specific region being a prepit region provided with prepits on the recording track.

49. A substrate for an optical recording medium, which comprises: tracking grooves and recording tracks interposed between the tracking grooves, the width $l_3$ of a tracking groove in a specific region and the width $l_1$ of a tracking groove in another region having the following relationship:

$$0.60 \leq l_3/l_1 \leq 0.95,$$

and the depth $d_2$ of a groove in the specific region and the depth $d_1$ of the groove in the another region having the following relationship:

$$0.80 \leq d_2/d_1 \leq 0.95,$$

the specific region being a prepit region provided with prepits on the recording track.

50. An optical recording medium which comprises: tracking grooves and a recording track interposed between the tracking grooves, the depth $d_2$ of a groove in a specific region being smaller than the depth $d_1$ of a groove in another region, the depth $d_1$ satisfying the following relationship:

$$\lambda/7n/ \leq d_1 \leq \lambda/5n,$$

and the depth $d_2$ satisfying the following relationship:

$$\lambda/8n/ \leq d_2 \leq \lambda/6n,$$

the specific region being a prepit region provided with prepits on the recording track, and wherein X is the wavelength of a reproducing beam to reproduce information from the optical recording medium and n is the refractive index of a substrate on which the grooves and recording track are formed.

51. An optical recording medium which comprises: tracking grooves and a recording track interposed between the tracking grooves, the width $l_3$ of a tracking groove in a specific region and the width $l_1$ of a tracking groove in another region having the following relationship:

$$0.60 \leq l_3/l_1 \leq 0.95,$$

the depth $d_2$ of a groove in the specific region being smaller than the depth $d_1$ of a groove in the another region, the depth $d_1$ satisfying the following relationship:

$$\lambda/7n \leq d_1 \leq \lambda/5n,$$

and the depth $d_2$ satisfying in the following relationship:

$$\lambda/8n \leq d_2 \leq \lambda/6n,$$

the specific region being a prepit region provided with prepits on the recording track, wherein $\lambda$ is the wavelength of a reproducing beam reproducing information from the optical recording medium and n is the refractive index of a substrate on which the grooves are formed.

52. A substrate for an optical recording medium, which comprises: tracking grooves and a recording track interposed between the tracking grooves, the depth $d_2$ of a groove in a specific region being smaller than the depth $d_1$ of a groove in another region, the depth $d_1$ satisfying the following relationship:

$$\lambda/7n \leq d_1 \leq \lambda/5n$$

the depth $d_2$ satisfying the following relationship:

$$\lambda/8n \leq d_2 \leq \lambda/6n$$

the specific region being a prepit region provided with prepits on the recording track, wherein $\lambda$ is the wavelength of a reproducing beam reproducing information on the substrate and wherein n is the refractive index of the substrate.

53. A substrate for an optical recording medium, which comprises: tracking grooves and a recording track interposed between the tracking grooves, the width $l_3$ of a tracking groove in a specific region and the width $l_1$ of a tracking groove in another region having the following relationship:

$$0.60 \leq l_3/l_1 \leq 0.95,$$

the specific region being a prepit region provided with prepits on the recording track.

54. An optical recording medium comprising: a substrate and a recording layer, the substrate comprising tracking tracks and a recording track interposed between the tracking tracks, the width $l_3$ of a tracking track in a specific region and the width $l_1$ of a tracking track in another region having the following relationship:

$$0.60 \leq l_3/l_1 \leq 0.95,$$

the specific region being a prepit region provided with prepits on the recording track.

55. An optical recording medium comprising: a substrate and a recording layer, the substrate comprising tracking grooves and a recording track interposed between the tracking grooves, the depth $d_2$ of a groove in a specific region and the depth $d_1$ of a groove in another region having the following relationship:

$$0.80 \leq d_2/d_1 \leq 0.95,$$

the specific region being a prepit region provided with prepits on the recording track.

56. An optical recording medium which comprises: tracking tracks and recording tracks interposed between the tracking tracks, wherein the relationship between the width $l_3$ of the tracking tracks in a prepit region provided with prepits on the recording track and the width $l_1$ of the tracking tracks in another region is set so that offset quantities of a tracking error signal in the prepit region and another region are substantially equal.

57. An optical recording medium which comprises: tracking grooves and recording tracks interposed between the tracking grooves, wherein the relation between the depth $d_2$ of a groove in a prepit region provided with prepits on the recording track and the depth $d_1$ of a groove in another region is set so that offset quantities of a tracking error signal in the prepit region and another region are substantially equal.

58. An optical recording medium which comprises: a tracking track and a recording track adjacent thereto, the width $l_3$ of the tracking track in a specific region and the width $l_1$ of the tracking track in another region have the following relationship:

$$0.60 \leq l_3/l_1 \leq 0.95$$

the specific region being a prepit region provided with prepits on the recording track.

59. An optical recording medium which comprises: a tracking groove and a recording track adjacent thereto, the depth $d_2$ of a groove in a specific region and the depth $d_1$ of a groove in another region having the following relationship:

$$0.80 \leq d_2/d_1 \leq 0.95,$$

the specific region being a prepit region provided with prepits on the recording track.

60. An optical recording medium which comprises: a tracking groove and a recording track adjacent thereto, the width $l_3$ of a tracking groove in a specific region and the width $l_1$ of a tracking groove in another region having the following relationship:

$$0.60 \leq l_3/l_1 \leq 0.95,$$

and the depth $d_2$ of the groove in the specific region and the depth $d_1$ of a groove in the another region having the following relationship:

$$0.80 \leq d_2/d_1 \leq 0.95,$$

the specific region being a prepit region provided with prepits on the recording track.

61. A substrate for an optical recording medium which comprises: a tracking track and a recording track adjacent thereto, the width $l_3$ of in a specific region and the width $l_1$ of the tracking tracks in another region having the following relationship:

$$0.60 \leq l_3/l_1 \leq 0.95,$$

the specific region being a prepit region provided with prepits on the recording track.

62. A substrate for an optical recording medium, which comprises: a tracking groove and a recording track adjacent thereto, the depth $d_2$ of a groove in a specific region and the depth $d_1$ of the groove in the another region having the following relationship:

$$0.80 \leq d_2/d_1 \leq 0.95,$$

the specific region being a prepit region provided with prepits on the recording track.

63. A substrate for an optical recording medium, which comprises: a tracking groove and a recording track adjacent thereto, the width $l_3$ of a tracking groove in a specific region and the width $l_1$ of a tracking groove in another region having the following relationship:

$$0.60 \leq l_3/l_5 \leq 0.95,$$

and the depth $d_2$ of a groove in the specific region and the depth $d_1$ of the groove in the another region having the following relationship:

$$0.80 \leq d_2/d_1 \leq 0.95,$$

the specific region being a prepit region provided with prepits on the recording track.

64. An optical recording medium which comprises: a tracking groove and a recording track adjacent thereto, the depth $d_2$ of a groove in a specific region being smaller than the depth $d_1$ of a groove in another region, the depth $d_1$ satisfying the following relationship:

$$\lambda/7n \leq d_1 \leq \lambda/5n,$$

and the depth $d_2$ satisfying the following relationship:

$$\lambda/8n \leq d_2 \leq \lambda/6n,$$

the specific region being a prepit region provided with prepits on the recording track, and wherein $\lambda$ is the wavelength of a reproducing beam to reproduce information from the optical recording medium and n is the refractive index of a substrate on which the grooves and recording track are formed.

65. An optical recording medium which comprises: a tracking groove and a recording track adjacent thereto, the width $l_3$ of a tracking groove in a specific region and the width $l_1$ of a tracking groove in another region having the following relationship:

$$0.60 \leq l_3/l_1 \leq 0.95,$$

the depth $d_2$ of a groove in the specific region being smaller than the depth $d_1$ of a groove in the another region, the depth $d_1$ satisfying the following relationship:

$$\lambda/7n \leq d_1 \leq \lambda/5n,$$

and the depth $d_2$ satisfying in the following relationship:

$$\lambda/8n \leq d_2 \leq \lambda/6n,$$

the specific region being a prepit region provided with prepits on the recording track, wherein $\lambda$ is the wavelength of a reproducing beam reproducing information from the optical recording medium and n is the refractive index of a substrate on which the groves are formed.

66. A substrate for an optical recording medium, which comprises: a tracking groove and a recording track adjacent thereto, the depth $d_2$ of a groove in a specific region being smaller than the depth $d_1$ of a groove in another region, the depth $d_1$ satisfying the following relationship:

$$\lambda/7n \leq d_1 \leq /5n,$$

the depth $d_2$ satisfying the following relationship:

$$\lambda/8n \leq d_2 \leq \lambda/6n,$$

the specific region being a prepit region provided with prepits on the recording track, wherein $\lambda$ is the wavelength of a reproducing beam reproducing information on the substrate and wherein n is the refractive index of the substrate.

67. A substrate for an optical recording medium, which comprises: a tracking groove and a recording track adjacent thereto, the width $l_3$ of a tracking groove in a specific region and the width $l_1$ of a tracking groove in another region having the following relationship:

$$0.60 \leq l_3/l_1 \leq 0.95,$$

the specific region being a prepit region provided with prepits on the recording track.

68. An optical recording medium comprising: a substrate and a recording layer, the substrate comprising a tracking track and a recording track adjacent thereto, the width $l_3$ of a tracking track in a specific region and the width $l_1$ of a tracking track in another region having the following relationship:

$$0.60 \leq l_3/l_1 \leq 0.95,$$

the specific region being a prepit region provided with prepits on the recording track.

69. An optical recording medium comprising: a substrate and a recording layer, the substrate comprising a tracking groove and a recording track adjacent thereto, the depth $d_2$ of a groove in a specific region and the depth $d_1$ of a groove in another region having the following relationship:

$$0.80 \leq d_2/d_1 \leq 0.95,$$

the specific region being a prepit region provided with prepits on the recording track.

70. An optical recording medium which comprises: a tracking track and a recording track adjacent thereto, wherein the relationship between the width $l_3$ of the tracking tracks in a prepit region provided with prepits on the recording track and the width $l_1$ of the tracking tracks in another region is set so that offset quantities of a tracking error signal in the prepit region and another region are substantially equal.

71. An optical recording medium which comprises: a tracking groove and a recording track adjacent thereto, wherein the relation between the depth $d_2$ of a groove in a prepit region provided with prepits on the recording track and the depth $d_1$ of a groove in another region is set so that offset quantities of a tracking error signal in the prepit region and another region are substantially equal.

* * * * *

UNITED STATES PATENT AND TRADEMARK OFFICE
CERTIFICATE OF CORRECTION

PATENT NO. : 5,407,720
DATED : April 18, 1995
INVENTOR(S) : HIROSHI OMATA

It is certified that error appears in the above-indentified patent and that said Letters Patent is hereby corrected as shown below:

ON THE COVER PAGE

At [56] References Cited

U.S. PATENT DOCUMENTS

"4,947,384 8/1990 Suzuk" should read
--4,947,384 8/1990 Suzuki--.

At [57] ABSTRACT

Line 4, "region." should read --regions.--.

Column 3

Line 1, "the" (second occurrence) should be deleted.
Line 41, "trackings" should read --tracking--.

Column 5

Line 55, "quantity" should read --the quantity--.

Column 6

Line 49, "preferably" should read
--and more preferably"--.

UNITED STATES PATENT AND TRADEMARK OFFICE
CERTIFICATE OF CORRECTION

PATENT NO. : 5,407,720
DATED : April 18, 1995
INVENTOR(S) : HIROSHI OMATA

It is certified that error appears in the above-indentified patent and that said Letters Patent is hereby corrected as shown below:

Column 7

Line 2, "other" should read --another--.
Line 12, "is" should read --are--.
Line 33, "the lowering the amplitude of AT" should read --lowering the amplitude of the AT--.

Column 8

Line 32, "are" should read --is--.

Column 12

Table 2, Example No. 5, "0" should read --0.95--.

Column 14

Line 58, "region" should read --a region--.

Column 15

Line 25, "$\lambda/8n \leq d_1 \leq \lambda/4n$" should read --$\lambda/8n < d_1 < \lambda/4n$--.
Line 45, "$\lambda/8n \leq d_2 \leq d_1.$" should read --$\lambda/8n \leq d_2 < d_1.$--.
Line 57, "region" should read --a region--.

Column 17

Line 33, "$0.60 \leq \ell_3/\ell_1 \leq 0.95/-13-$" should read --$0.60 \leq \ell_3/\ell_1 \leq 0.95,$--.

UNITED STATES PATENT AND TRADEMARK OFFICE
CERTIFICATE OF CORRECTION

PATENT NO. : 5,407,720
DATED : April 18, 1995
INVENTOR(S) : HIROSHI OMATA

It is certified that error appears in the above-indentified patent and that said Letters Patent is hereby corrected as shown below:

Column 18

Line 3, "$\lambda/7n \leq d_1 \leq \lambda/5n,$" should read --$\lambda/7n \leq d_1 \leq \lambda/5n,$--.
Line 8, "$\lambda/8n \leq d_2 \leq \lambda/6n,$" should read --$\lambda/8n \leq d_2 \leq \lambda/6n,$--.

Column 20

Line 12, "in" should be deleted.
Line 35, "$0.60 \leq \ell_3/\ell_5 \leq 0.95,$" should read --$0.60 \leq \ell_3/\ell_1 \leq 0.95,$--.

Column 21

Line 17, "groves" should read --grooves--.

Signed and Sealed this

Twenty-fifth Day of July, 1995

Attest:

BRUCE LEHMAN

*Attesting Officer*  *Commissioner of Patents and Trademarks*